June 11, 1929.   G. JOHNSON   1,716,493
LUBRICATING APPARATUS
Filed Aug. 25, 1925
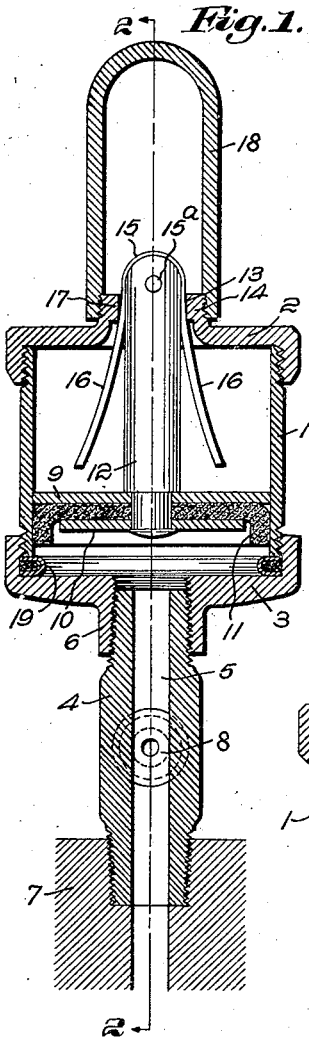
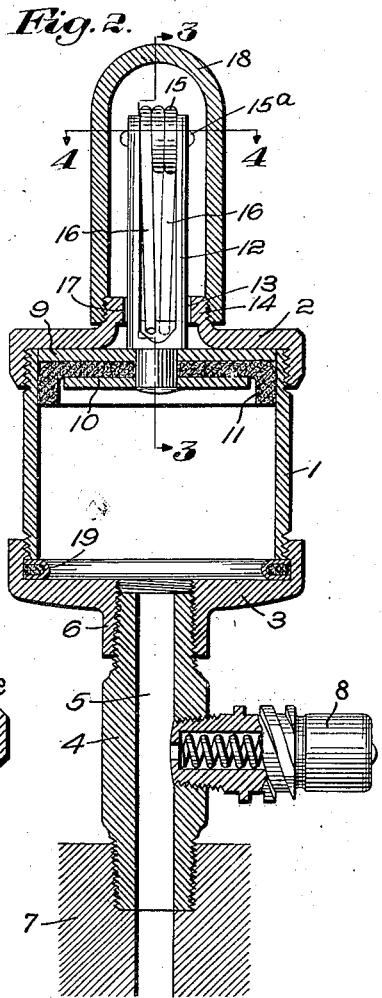
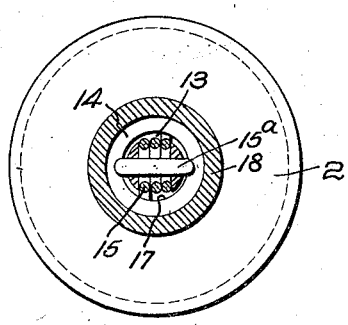
Inventor:
Gustav Johnson,
by Emery Booth Janney & Varney
Attys.

Patented June 11, 1929.

1,716,493

UNITED STATES PATENT OFFICE.

GUSTAV JOHNSON, OF WEST ROXBURY, MASSACHUSETTS, ASSIGNOR, BY MESNE ASSIGNMENTS, TO ALEMITE MANUFACTURING CORPORATION, OF CHICAGO, ILLINOIS, A CORPORATION OF DELAWARE.

LUBRICATING APPARATUS.

Application filed August 25, 1925. Serial No. 52,387.

This invention aims to provide improvements in lubricating apparatus and more particularly, though not exclusively, to improvements in lubricant supply cups.

In the drawings which illustrate a preferred embodiment of my invention:

Figure 1 is a vertical section showing a lubricant supply cup discharging lubricant to a bearing;

Fig. 2 is a section on the line 2—2 of Fig. 1 showing the cup filled with lubricant;

Fig. 3 is a section on the line 3—3 of Fig. 2; and

Fig. 4 is a plan section on the line 4—4 of Fig. 2 being partly in elevation.

Referring to the drawings I have illustrated a lubricant expelling cup particularly, though not exclusively, useful for lubricating bearings of motor vehicles. The cup is especially designed with a view to providing a reservoir of lubricant which may be attached directly to or adjacent to a bearing for supplying lubricant under pressure to the bearing only when the motor vehicle is in motion.

The cup illustrated in the drawings includes a cylinder portion 1 having an upper head 2 and a lower head 3 secured to opposite ends of the cylinder to provide a reservoir for the lubricant. A discharge pipe 4 having a discharge passage 5 therein has one end threaded into a boss 6 presented by the lower head 3 and the other end threaded into a bearing 7 to hold the cup in place and to conduct the lubricant into and from the reservoir. A lubricant receiving nipple 8 is threaded into the pipe 4 at one side thereof to receive a coupling through which lubricant may be supplied to the cup and the bearing.

Within the reservoir I have provided a piston comprising two metal washers 9 and 10 and a cup leather 11 held between the washers. A stem 12 is riveted to the piston and extends through an aperture 13 in a boss 14 provided on the upper head 2. This stem carries a spring 15 having a plurality of coils around a pin 15ª in the upper end of the stem 12 and a pair of oppositely disposed outwardly flaring wing portions 16—16 bearing against the wall 17 surrounding the aperture 13. The stem 12 is grooved throughout a substantial portion of its length to receive the wing portions 16—16 when fully contracted as illustrated in Fig. 3.

A cap 18 is threadedly secured to the boss 14 to cover the stem to prevent dust and dirt from entering the cup through the aperture 13.

A packing ring 19 is interposed between the lower end of the cylinder 1 and the lower head 3 to provide a tight joint therebetween for preventing leakage of lubricant from the reservoir when pressure is exerted upon the lubricant.

The reservoir may be filled with lubricant by connecting a supply of lubricant under pressure to the nipple 8 thereby forcing lubricant through the nipple 8 to the passage 5 then into the cup. The piston in the reservoir will be forced upwardly from the position shown in Fig. 1 to the position shown in Fig. 2 thereby permitting the reservoir to be filled with lubricant. If then the supply of lubricant through the nipple is continued the lubricant will be forced into the bearing 7 to clear it so that lubricant may be fed to it from the reservoir.

While the spring 15, including its wing portions 16—16, if unrestricted, would act to move the piston in the cup at a uniform rate of travel, in one direction, the lubricant in the cup normally resists such action of the spring so that the combined friction of the piston and the lubricant are sufficient to prevent the spring from moving the piston when the channel 20 in the bearing 7 is filled with lubricant and the cup is held still. The lubricant in the cup will be forced into the bearings 7 only when there is room for more lubricant in the channel 20, and if the cup is jarred sufficiently to allow the spring to overcome the friction and force the piston downward in the cup. Thus when the cup is used for lubricating the bearings of a motor vehicle or other machine which vibrates or is jarred during its operation, lubricant will be fed to the bearing 7 only when the car is in motion. When the car or machine is not in use, lubricant will be conserved because it will not be forced from the cup. With this type of device, lubricating of the bearings takes place only when the machine is in operation.

The shape of the wing portions 16—16 of the spring 15 is such that they transmit a uniform pressure to the piston during its full length of the discharge stroke, thereby feeding lubricant to the bearing under substantially uniform flow and pressure whenever the piston moves in the cup. The portions 16—16 of the spring act as a brake to govern the pressure exerted upon the piston, and at the same time provide the means for pressing downwardly upon the piston. Thus I have provided a single spring means which moves the piston and at the same time governs the pressure which is tranmitted to the piston, so that the result is a uniform rate of pressure on the piston throughout its travel.

The pin 15ª projects beyond the sides of the stem 12 to provide a stop for limiting the downward movement of the piston (Figs. 1 and 4) to prevent the cup leather 11 from being crushed against the packing ring 19 as best illustrated in Fig. 1.

While I have shown and described a preferred embodiment of my invention it will be understood that changes involving omission, substitution, alteration and reversal of parts and even changes in the mode of operation may be made without departing from the scope of my invention which is best defined in the following claims.

Claims:

1. A lubricant supply cup comprising a reservoir, a piston in said reservoir for forcing the lubricant therefrom, a piston stem and spring means carried by said stem for maintaining a substantially uniform pressure upon the piston in the direction of and throughout its entire discharge stroke.

2. A lubricant supply cup comprising a lubricant reservoir, a piston in said reservoir for forcing the lubricant therefrom, and a spring presenting a wing portion for slidable engagement with the wall of an aperture provided at one end of said reservoir thereby to exert a substantially uniform pressure on said piston throughout its entire stroke.

3. A lubricant supply cup comprising a lubricant reservoir, a piston in said reservoir for forcing the lubricant therefrom, a stem secured to said piston and spring means carried by said stem for exerting a substantially uniform pressure upon said stem thereby to force said piston against the lubricant and force lubricant from said cup at substantially the same rate of pressure throughout the entire length of the stroke when said reservoir is jarred.

4. A lubricant supply cup comprising a lubricant reservoir, a piston in said reservoir for forcing the lubricant therefrom, a stem secured to said piston and spring means carried by said stem said spring means presenting oppositely disposed wing portions cooperating with the wall of an aperture through which said stem projects thereby to provide means for controlling and exerting a pressure on said piston at all times.

5. A lubricant supply cup comprising a reservoir, a piston in said reservoir, a stem carried by said piston and spring means carried by said stem for supplying the pressure to operate said piston, said spring means including a wing portion cooperating with the wall of an aperture, through which the stem and wing portion pass, to move said stem downwardly in said reservoir when said cup is jarred, movement of said piston being opposed by the lubricant when said cup is held motionless.

6. A lubricant supply cup comprising a reservoir, a piston in said reservoir, a stem carried by said piston and a single spring means carried by said stem for supplying the pressure to operate said piston, said spring means including a plurality of wing portions cooperating with the wall of an aperture, through which the stem and wing portion pass, to move said stem downwardly in said reservoir at a uniform rate of travel when said cup is jarred.

7. A lubricant supply cup comprising a lubricant reservoir, a piston in said reservoir for forcing the lubricant therefrom, contractible and expansible generally curved spring fingers operable, when said cup is jarred, to urge said piston toward the discharge end of said reservoir at a relatively slow rate of travel, a discharge pipe connected to the outlet end of said reservoir and a lubricant receiving nipple secured to said pipe for connection with a source of lubricant under pressure for filling said reservoir.

8. A lubricant supply cup comprising a reservoir, a piston in said reservoir, spring means for moving said piston to force lubricant from said reservoir only when said cup is jarred and a nipple through which the reservoir may be filled from a source of lubricant under pressure.

In testimony whereof, I have signed my name to this specification.

GUSTAV JOHNSON.